US012692941B2

(12) United States Patent
Helmig et al.

(10) Patent No.:  US 12,692,941 B2
(45) Date of Patent:      Jul. 28, 2026

(54) SEALING DEVICE FOR A ROD

(71) Applicant: HAMMELMANN GMBH, Oelde (DE)

(72) Inventors: Egbert Helmig, Ennigerloh (DE);
Christian Stoffers, Rheda-Wiedenbrück (DE)

(73) Assignee: HAMMELMANN GmbH, Oelde (DE)

( * ) Notice: Subject to any disclaimer, the term of this patent is extended or adjusted under 35 U.S.C. 154(b) by 20 days.

(21) Appl. No.: 18/561,007

(22) PCT Filed: May 13, 2022

(86) PCT No.: PCT/EP2022/063052
§ 371 (c)(1),
(2) Date: Nov. 15, 2023

(87) PCT Pub. No.: WO2022/243193
PCT Pub. Date: Nov. 24, 2022

(65) Prior Publication Data
US 2024/0255057 A1     Aug. 1, 2024

(30) Foreign Application Priority Data

May 17, 2021    (DE) ..................... 10 2021 112 742.4

(51) Int. Cl.
*F16J 15/06* (2006.01)
(52) U.S. Cl.
CPC ..................................... *F16J 15/06* (2013.01)
(58) Field of Classification Search
CPC .... F16J 15/06; F16J 15/20; F16J 15/24; F16J 15/26; F16J 15/28; F16J 15/18; F16J 15/181; F16J 15/187; F16J 15/56
See application file for complete search history.

(56) References Cited

U.S. PATENT DOCUMENTS

| | | | | |
|---|---|---|---|---|
| 2,901,044 A | * | 8/1959 | Arnold | .................. E21B 23/042 166/212 |
| 4,406,463 A | * | 9/1983 | Fabrowsky | .............. F16J 15/56 277/422 |

(Continued)

FOREIGN PATENT DOCUMENTS

| | | |
|---|---|---|
| DE | 2846172 A1 | 4/1980 |
| DE | 19604132 A1 | 8/1997 |

(Continued)

OTHER PUBLICATIONS

International Search Report and Written Opinion mailed Sep. 20, 2022 in related/corresponding International Application No. PCT/EP2022/063052.

(Continued)

*Primary Examiner* — Christine M Mills
*Assistant Examiner* — L. Susmitha Koneru
(74) *Attorney, Agent, or Firm* — PATENT PORTFOLIO BUILDERS PLLC

(57)     ABSTRACT

A sealing device for sealing a rod that is moveable movable in a high-pressure chamber of a pressure-resistant housing filled with a liquid medium, between the high-pressure chamber and a low-pressure region. The sealing device includes a sealing cylinder and a sealing ring for statically sealing a first annular gap and which is arranged resting on an outer jacket surface of the sealing cylinder near the high-pressure-side end face. The sealing cylinder has at least one connecting channel extending from its outer jacket surface to an inner jacket surface. The position of the connecting channel is adapted to the material of the sealing cylinder for preventing deformation of the sealing cylinder in an area remote from the press ring.

9 Claims, 3 Drawing Sheets

(56)     References Cited

U.S. PATENT DOCUMENTS

Figure 3:
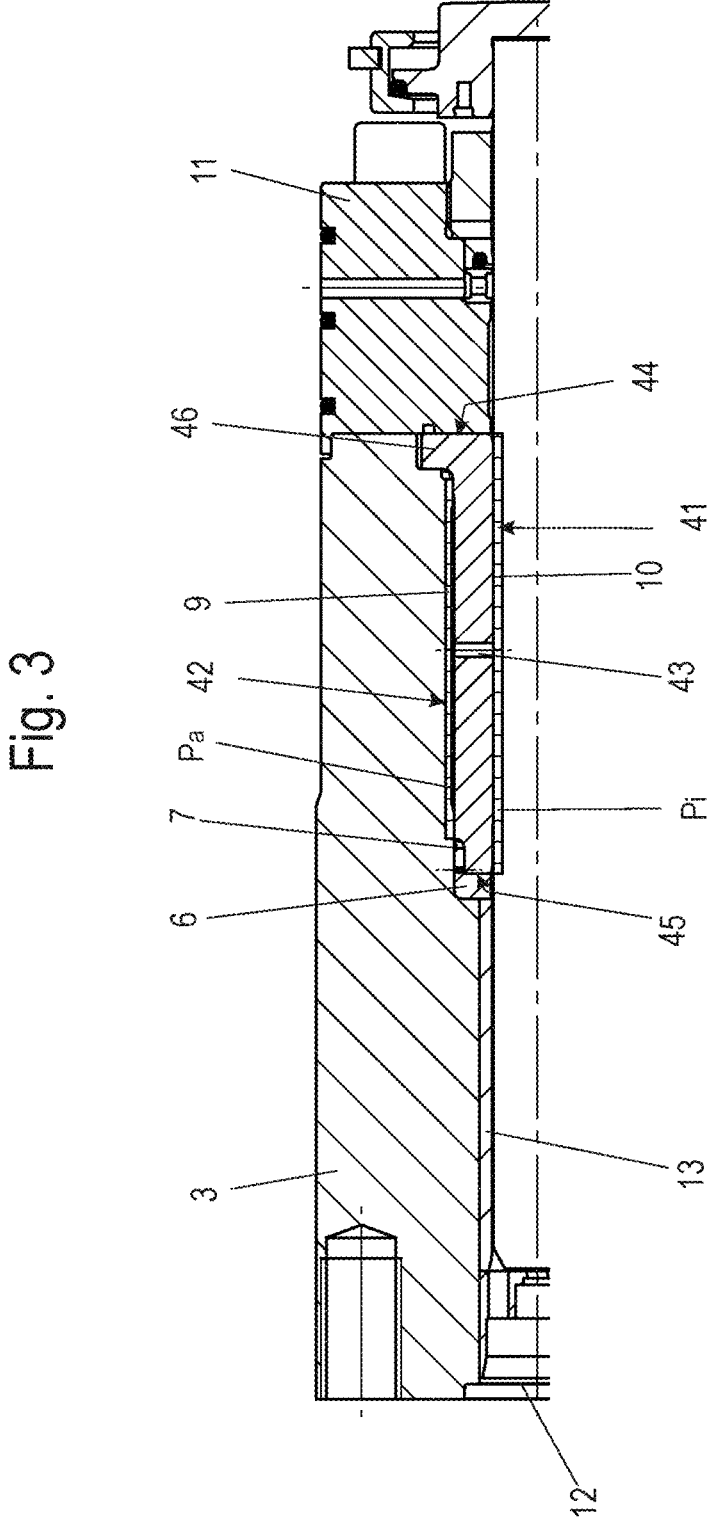

| | | | |
|---|---|---|---|
| 4,840,548 A | 6/1989 | Hammelmann | |
| 5,848,880 A | 12/1998 | Helmig | |
| 10,760,685 B2 * | 9/2020 | Iehl ........................ | F16J 15/183 |
| 10,890,258 B2 * | 1/2021 | Rabhi .................... | F16J 15/441 |
| 2009/0278068 A1 * | 11/2009 | Cho ..................... | F16J 15/3204 |
| | | | 251/214 |
| 2020/0263809 A1 * | 8/2020 | Gradle .................... | F16K 41/04 |

FOREIGN PATENT DOCUMENTS

| | | | |
|---|---|---|---|
| DE | 102018001813 A1 | 9/2018 |
| EP | 1353096 B1 | 9/2004 |
| GB | 1407874 A | 10/1975 |

OTHER PUBLICATIONS

Search Report created Jan. 5, 2022 in related/corresponding DE Application No. 10 2021 112 742.4.

* cited by examiner

Fig. 1

Fig. 2

SEALING DEVICE FOR A ROD

BACKGROUND AND SUMMARY OF THE INVENTION

Exemplary embodiments of the present invention relate to a sealing device for a rod.

EP 1 353 096 B1 discloses a generic sealing device. A sealing ring is used to seal a moving rod in the transition area between a high-pressure area and a low-pressure area of a guide chamber of a housing that guides the rod. The sealing ring encloses the rod and is partially deformed by the high pressure in the high-pressure area with the aid of a press ring, so that the deformation of the sealing ring reduces the gap between the sealing ring and the rod to such an extent that the latter only allows the desired amount of fluid to leak through.

Such a gap sealing device has proven itself in practice.

The problem is that, especially at very high pressures in the high-pressure range of up to 3000 or 4000 bar, the operating pressure applied to the outer surface of the sealing cylinder is so great that the sealing cylinder sometimes deforms too much even before the press ring, depending on the elastic modulus of the material of the sealing cylinder.

Exemplary embodiments of the present invention provide a sealing device for high-pressure equipment that ensures durable operation regardless of the material of the sealing cylinder.

The sealing device according to the invention for sealing a rod that can move in translation and/or rotation in a high-pressure space of a pressure-resistant housing filled with a liquid medium between the high-pressure space and a low-pressure region has a sealing cylinder, which can be accommodated in the housing with formation of a first annular gap between an outer surface of the sealing cylinder and an inner wall of the housing bounding the high-pressure space.

An inner diameter of a circumferential inner surface of the sealing cylinder is dimensioned such that the rod can be embraced by the cylinder while forming a second annular gap that forms a dynamic seal.

The sealing device further comprises a press ring abutting the outer jacket surface of the sealing cylinder near a low-pressure-side end face for statically sealing the first annular gap and for deforming a portion of the inner jacket surface of the sealing cylinder in the direction of the rod.

To form this deformation, a pressure ring receiving a portion of the rod is attached to the housing in the low-pressure range, which keeps the sealing cylinder pressed into the housing while pressing the pressure ring against a step-shaped projection of the pressure-resistant housing, forming the deformation of the portion of the inner surface of the jacket of the sealing cylinder.

A sealing ring, which is dynamically loaded with fluid pressure, is arranged in contact with the outer surface of the sealing cylinder near the high-pressure end face for static sealing of the first annular gap. Furthermore, the sealing cylinder has at least one connecting channel extending from its outer surface to its inner surface.

The position of the connecting channel is adapted to the material of the sealing cylinder to prevent function-restricting deformation of the sealing cylinder in an area away from the press ring.

By sealing the first annular gap close to the high-pressure-side end face of the sealing cylinder and the connecting channel provided in the sealing cylinder, which fluidically connects the two annular gaps, it is possible, depending on the positioning of the connecting channel, to adjust the fluid pressure acting on the outer jacket surface of the sealing cylinder to the fluid pressure of the second annular gap, which acts as a throttle gap in which the prevailing pressure decreases with increasing distance from the high-pressure-side end face of the sealing cylinder, to the pressure prevailing in the area of the connecting channel in the second annular gap. As a result, the pressure acting on the outer surface of the sealing cylinder can be adapted to the respective material of the sealing cylinder by positioning the connecting channel in the sealing cylinder, so that the desired deformation and loading of the sealing cylinder can be adapted in accordance with its modulus of elasticity and only occurs in the area of the press ring.

According to an advantageous embodiment, the connecting channel is introduced in a region of the jacket of the sealing cylinder between the press ring and the sealing ring, the connecting channel being spaced from the press ring or the sealing ring by at least 10% of the distance between the press ring and the sealing ring.

The resulting reduction in the pressure applied to the outer surface of the sealing cylinder allows the use of numerous materials for the sealing cylinder.

In a preferred embodiment, a ring seat is formed in the outer surface of the sealing cylinder close to the high-pressure end face of the sealing cylinder to hold the sealing ring securely.

In a particularly preferred embodiment, the ring seat is designed as a step extending from the high-pressure end face of the sealing cylinder into the outer shell surface of the sealing cylinder.

During assembly, the sealing ring can thus be slipped onto the sealing cylinder from the high-pressure end face in an extremely simple manner.

According to another preferred embodiment of the invention, the high-pressure side end face of the sealing cylinder is covered with a ring cap.

An advantage of using such an annular cap is primarily that it allows a free low-stress design of the housing with radii, independent of an otherwise necessary radius-free support surface for the seal to the high-pressure area.

According to a further preferred embodiment, the sealing cylinder has a collar near the low-pressure end face, against whose rear side facing away from the low-pressure end face the press ring rests.

This enables precise positioning of the press ring and also of the sealing cylinder itself, especially in the direction of the longitudinal axis of the sealing cylinder.

After insertion of the sealing cylinder into the flameproof housing, the resulting squeezing of the press ring between the collar and a step of the flameproof housing causes the desired deformation of the sealing cylinder in the direction of the second annular gap.

The sealing cylinder is preferably made of a ceramic material, hard metal, steel, in particular stainless steel, bronze, or a plastic.

The arrangement according to the invention of a translationally and/or rotationally movable rod in a high-pressure space of a pressure-resistant housing filled with a liquid medium has, for the purpose of separating the high-pressure space from a low-pressure region, a sealing cylinder accommodated in the housing with the formation of a first annular gap between a circumferential outer surface of the sealing cylinder and an inner wall of the housing bounding the high-pressure space.

A section of the rod is accommodated in the sealing cylinder to form a second annular gap forming a dynamic seal, a press ring for statically sealing the first annular gap and for deforming a section of the inner surface of the jacket of the sealing cylinder in the direction of the rod bearing against the outer surface of the jacket of the sealing cylinder near a low-pressure-side end face.

A sealing ring is arranged on the outer surface of the sealing cylinder near the high-pressure end face for static sealing of the first annular gap.

The sealing cylinder has at least one connecting channel extending from its outer surface to its inner surface, via which the first annular gap is fluidly connected to the second annular gap.

BRIEF DESCRIPTION OF THE DRAWING FIGURES

Preferred embodiments are explained in more detail below with reference to the accompanying drawings. They show:

Figure 1:
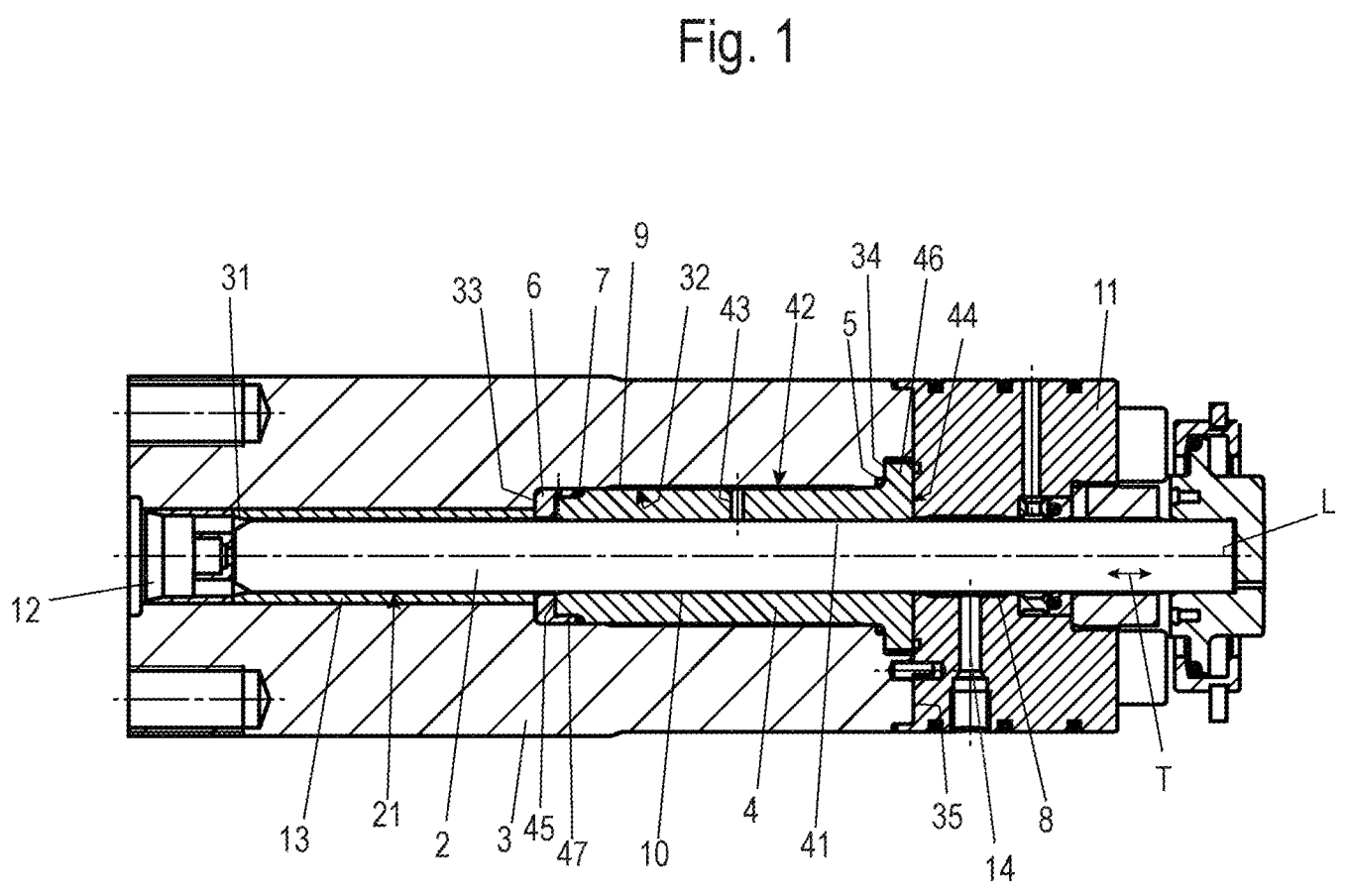

FIG. 1 a sectional view through a rod and a housing surrounding it with a sealing cylinder arranged therein, FIG. 2 a sectional view of a section of the arrangement shown in FIG. 1 with schematic representation of pressures prevailing at the outer surface of the jacket and the inner surface of the sealing cylinder in the pressure stroke of the arrangement and FIG. 3 a representation corresponding to FIG. 2 in the suction stroke of the arrangement.

DETAILED DESCRIPTION

In the following figure description, terms such as top, bottom, left, right, front, rear, etc. refer exclusively to the exemplary representation and position of the sealing device, housing, sealing cylinder, rod, annular gap, connecting channel and the like selected in the respective figures. These terms are not to be understood restrictively, i.e., different working positions or the mirror-symmetrical design or the like may change these references.

In the following, a static seal is understood to be a fluidic seal between two bodies that do not move relative to each other.

In the following, a dynamic seal is understood to be a fluidic seal or a reduction of a flow to a permissible level between two bodies moving relative to each other.

Figure 2:
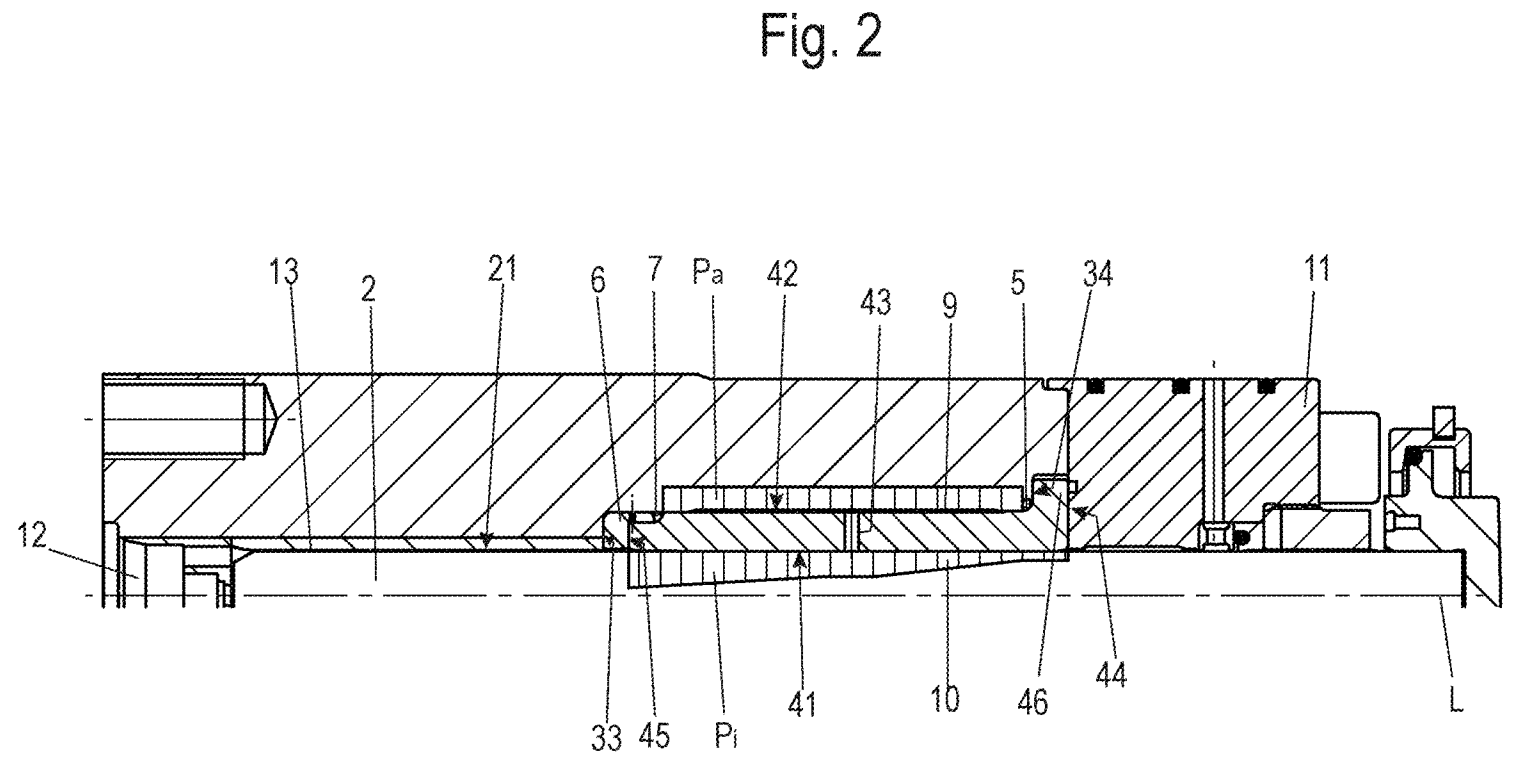

FIGS. 1 to 3 each show a sealing device for a rod 2 extending between a high-pressure chamber 31 of a housing 3 and a low-pressure region 8. The rod 2 can be moved translationally in the direction of translation T along its longitudinal axis L. The rod 2 can also be moved rotationally. A rotational movement of the rod 11 about its longitudinal axis L is also conceivable.

At least one section of the rod 2 is movably mounted inside the housing 3.

A sealing cylinder 4 is provided to separate the high-pressure chamber 31 from the low-pressure region 8 prevailing, by way of example, in the region of a pressure ring 11, which sealing cylinder 4 is accommodated in the housing 3 to form a first annular gap 9 between a circumferential outer surface 42 of the sealing cylinder 4 and an inner wall 32 of the housing 3 bounding the high-pressure chamber 31.

The thrust ring 11 shown in FIGS. 1 to 3 also serves firstly to support the rod 2 and secondly to press the sealing cylinder 4 into the housing 3, to which the thrust ring 11 is firmly screwed.

The rod 2 is passed through a passage of the sealing cylinder 4 bounded by a jacket inner surface 41 of the sealing cylinder 4. The diameter of the inner surface 41 of the sealing cylinder 4 is slightly larger than the diameter of the outer surface 42 of the rod 2, so that the rod 2 together with the sealing cylinder 4 form a dynamic seal, also known as a gap seal. Such a gap seal is characterized by the fact that at the high-pressure end of the gap seal, the high pressure is also present in the annular gap 10, but gradually decreases in the direction of the low-pressure end of the annular gap 10.

In order to keep leakage, which is also mentioned in EP 1 353 096 B1 (discussed above) and which results from the use of such a throttle gap, as small as possible, a press ring 5 is also provided here, as can be seen in FIGS. 1 to 3, on the outer jacket surface 42 of the sealing cylinder 4 near the low-pressure-side end face 44, which causes the deformation of a section of the inner surface 41 of the sealing cylinder 4 in the direction of the rod 2 as soon as the thrust ring 11 is screwed onto the housing 3, thereby pressing the thrust ring 5 against a step-shaped shoulder of the housing 3. As a result of the force thus applied in the direction of the longitudinal axis L of the rod 2, the press ring 5 is deformed and, in so doing, is held resistant to expansion from two sides by the pressure-resistant housing 3 and from a third side, which extends perpendicularly to the direction of force F in the axial direction of the rod 2, by the sealing cylinder 4 itself, a force is generated by the press ring 5 that is directed essentially radially towards the rod 2 and which causes the desired deformation of the inner surface 41 of the jacket of the sealing cylinder 4 in the direction of the rod 2.

The press ring 5 also serves to statically seal the first annular gap 9 between the outer jacket surface 42 of the sealing cylinder 4 and the inner wall 32 of the housing 3 bounding the high-pressure chamber 31.

As is further shown in FIGS. 1 to 3, a sealing ring 7 for static sealing of the first annular gap 9 is arranged resting on the outer jacket surface 42 of the sealing cylinder 4 near the high-pressure-side end face 45. This sealing ring 7 thus prevents the annular gap 9 from being acted upon by the pressure prevailing in the high-pressure chamber 31.

Furthermore, the sealing cylinder 4 has at least one connecting channel 43 extending from its outer surface 42 to its inner surface 41, via which the first annular gap 9 is fluidly connected to the second annular gap 10.

This allows the first annular gap 9 to be subjected to the pressure that is present at the level of the connecting channel 43 in the second annular gap 10, which is designed as a throttle gap.

As a result, a predetermined pressure continues to act on the outer surface 42 of the sealing cylinder 4 as compensation for the pressure prevailing in the second annular gap 10, which prevents or at least greatly reduces a function-limiting deformation of the sealing cylinder 4 in the area of the annular gaps 9, 10. Function-restricting deformation is understood to mean, in particular, a deformation of the sealing cylinder 4 in the radial direction towards the outer surface of the rod 2, which could lead to the rod 2 jamming.

The sealing of the first annular gap 9 on both sides, effected by the press ring 5 and the sealing ring 7 and the connecting channel 43 in the sealing cylinder 4, thus creates an improved pressure equilibrium on both sides of the cylinder shell surface of the sealing cylinder 4 compared to the system known from the prior art, which allows a variety of materials for the sealing cylinder 4.

The connecting channel 43 is preferably introduced in a region of the jacket of the sealing cylinder 4 between the press ring 5 and the sealing ring 7, the connecting channel 43 being at a distance of at least 10%, preferably at least 25%, of the distance between the press ring 5 and the sealing ring 7 from the press ring 5 or the sealing ring 7. The positioning of the connecting channel depends, in particular, on the material selected for the sealing cylinder 4.

In the embodiments shown in FIGS. 1 to 3, the connecting channel 43 is inserted approximately centrally between the low-pressure-side end face 44 and the high-pressure-side end face 45.

Several connecting channels 43 extending in the same radial plane of the sealing cylinder 4 are also conceivable.

The sealing cylinder 4 is preferably made of a ceramic material, hard metal, steel, in particular stainless steel, bronze, or a plastic, or also a mixed material of one or more of the above-mentioned materials. Depending on the selection of the material or material mixture or E-modulus of the material from which the sealing cylinder is made, the connecting channel is placed in such a way that deformation of the sealing cylinder 4 is prevented in an area away from the press ring 5.

FIG. 2 shows an example of the pressure applied to the lateral surfaces of the sealing cylinder 4 in the pressure stroke of the rod 2.

As already explained above, the pressure $p_i$ acting on the inner surface 41 of the sealing cylinder 4 decreases in the second annular gap 10 from the high-pressure side to the low-pressure side.

The pressure $p_a$ applied to the outer jacket surface 42 is constant due to the sealing of the first annular gap 9 effected by the press ring 5 and the sealing ring 7 and corresponds to the pressure at the inner jacket surface 41 of the sealing cylinder 4 at the level of the connecting channel 43.

The result is that, particularly near the low-pressure end of the first annular gap 9, there is a significantly weakened pressure difference compared with the system known from the prior art, in which the full high-pressure side pressure would still be present even in the region of the low-pressure end of the first annular gap 9.

In addition, the reduced pressure $p_a$ applied to the outer surface of the shell 42 results in a lower load on the press ring 5.

FIG. 3 shows a representation of the arrangement corresponding to FIG. 2 during a suction stroke of the rod 2, in which the pressure on the high-pressure side is significantly lower and, accordingly, the pressure $p_i$ on the jacket inner surface 41 of the sealing cylinder 4 in the second annular gap 10 is almost constant throughout and, accordingly, the pressure $p_a$ applied to the jacket outer surface 42 of the sealing cylinder 4 is also correspondingly lower.

In the embodiments shown in FIGS. 1 to 3, the rod 2 is designed as a plunger of a high-pressure system, with a valve seat 12, preferably with a suction valve and a pressure valve, being arranged at the high-pressure end of the rod 2.

For guiding the rod 2 on the high-pressure side beyond the sealing cylinder 4, a sleeve 13 is preferably provided, which serves to further reduce the high-pressure space 31 filled with liquid medium. For receiving the sealing ring 7, as shown in FIGS. 1 to 3, an annular receptacle 47 is formed in the outer jacket surface 42 of the sealing cylinder 4 near the high-pressure-side end face 45 of the sealing cylinder 4.

This ring seat 47 is preferably designed here as a step extending from the high-pressure-side end face 45 of the sealing cylinder 4 into the outer shell surface 42 of the sealing cylinder 4.

Further, the high pressure side end face 45 of the sealing cylinder 4 is preferably covered by a ring cap 6.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

2 Rod, rod
21 Sheathing
22 Guide room
23 High pressure range
3 Housing
31 High pressure room
32 Interior wall
33 Stage
34 Stage
35 Low pressure face
4 Sealing cylinder
41 Inner surface of jacket
42 Sheath outer surface
43 Connecting channel
44 Front side
45 Front side
46 Collar
47 Ring recording
5 first press ring
6 Ring cap
7 second press ring
8 Low pressure range
9 first annular gap
10 second annular gap
11 Pressure ring
12 High pressure nozzle
13 Sleeve
14 Leakage channel
T Translation direction
X Direction
Y Direction
Z Direction
$p_i$ Pressure in the second annular gap
$p_a$ Pressure in the first annular gap

The invention claimed is:

1. A sealing device for sealing a rod, wherein the rod is translationally or rotationally movable in a high-pressure chamber of a pressure-resistant housing filled with a liquid medium, between the high-pressure chamber and a low-pressure region, the sealing device comprising:

a sealing cylinder accommodatable in the housing to form a first annular gap between a jacket outer surface of the sealing cylinder and an inner wall of the housing bounding the high-pressure chamber, wherein an inner diameter of a jacket inner surface of the sealing cylinder is dimensioned such that the rod is embraceable by the sealing cylinder while forming a second annular gap forming a dynamic seal;

a press ring abutting the outer jacket surface of the sealing cylinder near a low-pressure-side end face to statically seal the first annular gap and to deform a portion of the inner jacket surface of the sealing cylinder in a direction of the rod;

a pressure ring fastened to the housing in the low-pressure area and receiving a partial area of the rod, which maintains the sealing cylinder pressed into the housing while pressing the pressure ring against a step-shaped projection of the pressure-resistant housing, forming a deformation of the partial area of the inner surface of the jacket of the sealing cylinder;

a sealing ring, configured to statically seal the first annular gap, is arranged in contact with the outer surface of the sealing cylinder near a high-pressure end face, wherein the sealing cylinder has at least one connecting channel extending from the outer jacket surface of the sealing cylinder to the inner jacket surface of the sealing cylinder, and wherein a position of the at least one connecting channel is adjusted based on a material of the sealing cylinder to prevent deformation of the sealing cylinder in an area remote from the press ring.

2. The sealing device of claim 1, wherein the connecting channel is positioned in a region of the inner and outer jacket surfaces of the sealing cylinder between the press ring and the sealing ring, wherein the connecting channel is spaced from the press ring or from the sealing ring by at least 10% of a distance between the press ring and the sealing ring.

3. The sealing device of claim 2, wherein the connecting channel is spaced from the press ring or from the seal ring by at least 25% of the distance between the press ring and the seal ring.

4. The sealing device of claim 1, wherein close to the high-pressure-side end face of the sealing cylinder, an annular receptacle is integrally formed in the outer jacket surface of the sealing cylinder, wherein the sealing ring is received in the annular receptacle.

5. The sealing device of claim 4, wherein the annular receptacle is a step extending from the high-pressure-side end face of the sealing cylinder into the outer jacket surface of the sealing cylinder.

6. The sealing device of claim 1, wherein the high-pressure-side end face of the sealing cylinder is covered by a ring cap.

7. The sealing device of claim 1, wherein the sealing cylinder has a collar near the low-pressure-side end face, wherein the press ring bears against a rear side of the collar facing away from the low-pressure-side end face.

8. The sealing device of claim 1, wherein the sealing cylinder is ceramic.

9. An arrangement comprising:

a pressure-resistant housing filled with a liquid medium;

a rod, which is translationally or rotationally movable in a high-pressure chamber of the pressure-resistant housing between the high-pressure chamber and a low-pressure region; and a sealing device configured to seal the rod, the sealing device comprising a sealing cylinder accommodatable in the housing to form a first annular gap between a jacket outer surface of the sealing cylinder and an inner wall of the housing bounding the high-pressure chamber, wherein an inner diameter of a jacket inner surface of the sealing cylinder is dimensioned such that the rod is embraceable by the sealing cylinder while forming a second annular gap forming a dynamic seal;

a press ring abutting the outer jacket surface of the sealing cylinder near a low-pressure-side end face to statically seal the first annular gap and to deform a portion of the inner jacket surface of the sealing cylinder in a direction of the rod;

a pressure ring fastened to the housing in the low-pressure area and receiving a partial area of the rod, which maintains the sealing cylinder pressed into the housing while pressing the pressure ring against a step-shaped projection of the pressure-resistant housing, forming a deformation of the partial area of the inner surface of the jacket of the sealing cylinder;

a sealing ring, configured to statically seal the first annular gap, is arranged in contact with the outer surface of the sealing cylinder near a high-pressure end face, wherein the sealing cylinder has at least one connecting channel extending from the outer jacket surface of the sealing cylinder to the inner jacket surface of the sealing cylinder, and wherein a position of the at least one connecting channel is adjusted based on a material of the sealing cylinder to prevent deformation of the sealing cylinder in an area remote from the press ring.

* * * * *